(No Model.)
C. W. GLIDDEN.
HEELING MACHINE.
No. 377,300. Patented Jan. 31, 1888.
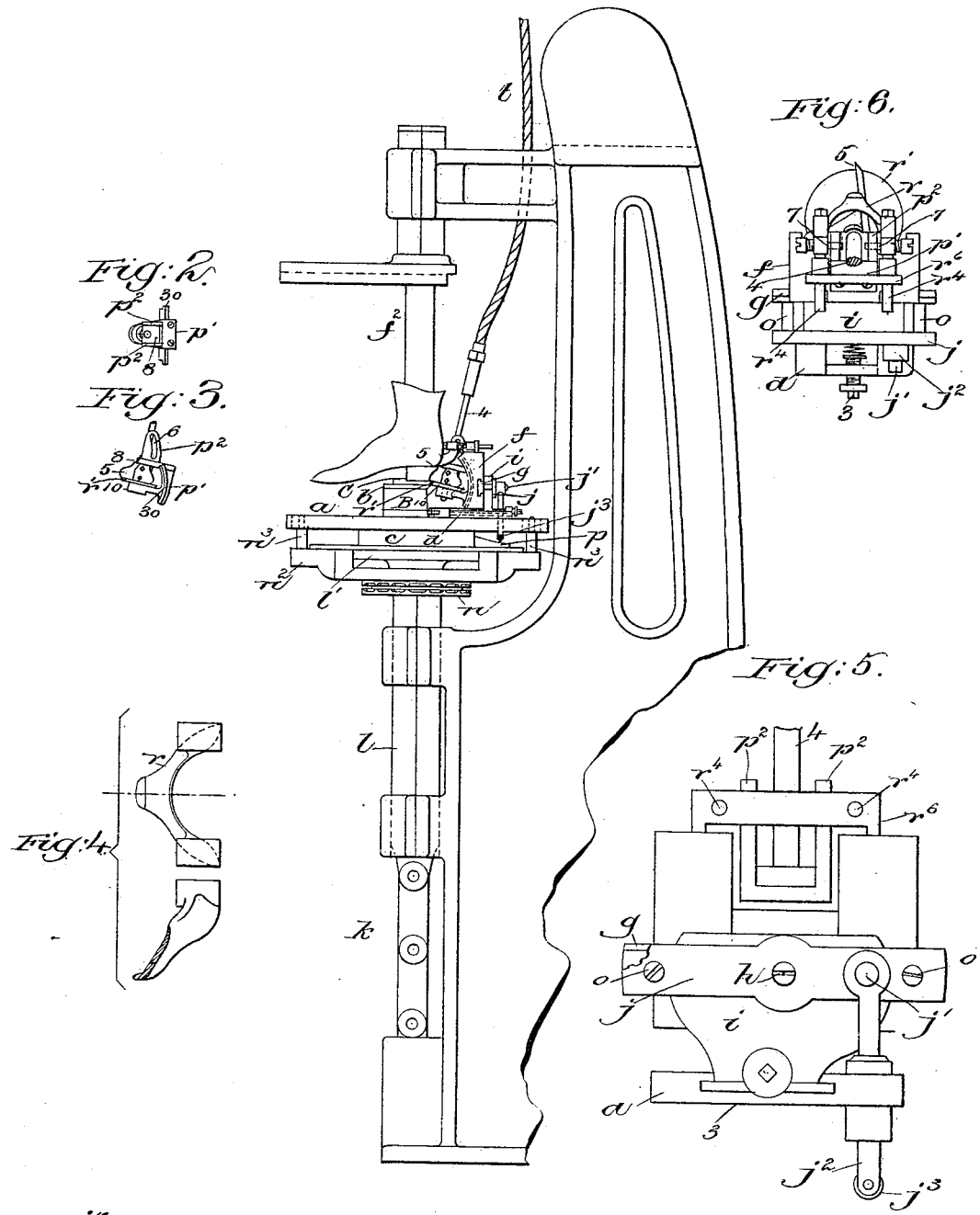
Witnesses.
Fred L. Emery.
John F. C. Branchlet.
Inventor.
Charles W. Glidden.
by Crosby & Gregory
Attys.

UNITED STATES PATENT OFFICE.

CHARLES W. GLIDDEN, OF LYNN, ASSIGNOR TO JAMES W. BROOKS, TRUSTEE, OF CAMBRIDGE, MASSACHUSETTS.

HEELING-MACHINE.

SPECIFICATION forming part of Letters Patent No. 377,300, dated January 31, 1888.

Application filed October 21, 1887. Serial No. 252,991. (No model.)

*To all whom it may concern:*

Be it known that I, CHARLES W. GLIDDEN, of Lynn, county of Essex, and State of Massachusetts, have invented an Improvement in Heeling-Machines, of which the following description, in connection with the accompanying drawings, is a specification, like letters on the drawings representing like parts.

This invention has for its object to improve that class of heel-trimming machines wherein the heel to be trimmed is attached to the sole.

My invention is herein shown as embodied in connection with a machine substantially such as described in United States Patents Nos. 203,440 and 321,017, heretofore granted to me, to which reference may be made, for nailing heels upon soles.

Herein the rotary cutter employed to trim the heel is attached to a short spindle having its journals mounted in bearings of a segmental cutter-carrying frame, which is made to slide in segmental guideways of a carriage, to be described, common to the said patent, and mounted on a tipping frame or plate, the axis of which is horizontal. One end of the spindle carrying the rotary cutter has connected to it one end of a flexible or spiral wire shaft, of usual construction. The carriage referred to serves as a guide for the shank of a rand-guide, the lip of which enters the rand-crease between the upper and sole, the said shank having a roller or other stud, which enters a cam-slot in an arm of the said segmental cutter-carrying frame. The center of the arc in which the cutter-carrying frame is made to slide or move up or down is so located with relation to the lip of the rand-guide as to enable the cutter-carrying frame and cutter to descend and ascend at the proper times, but without moving the lip of the rand-guide out of the rand-crease, as the acting edges of the blades of the rotating cutter follow the heel in the direction of its length, as well as about its sides. As the cutter-carrying frame rises and falls, the spindle of the cutter travels in the arc of a circle more or less inclined from a vertical line, that depending upon the variation of the tipping frame or plate referred to from true horizontal position through the cam which controls the movement of the said tipping plate.

Figure 1 in side elevation represents a sufficient portion of a heeling-machine to enable my invention to be understood. Fig. 2 is a top or plan view of the segmental cutter-carrying frame; Fig. 3, a side elevation of the frame shown in Fig. 2, with the cutter added; Fig. 4, a plan view of the rand-guide enlarged. Fig. 5 is an enlarged right-hand side view of parts of the devices shown in Fig. 1 as instrumental in effecting the movement of the tipping frame, and Fig. 6 is an enlarged top or plan view of the trimming devices and rand-guide removed from the trimmer-lever $a$.

The frame-work, of suitable shape to support the working parts, contains a die-bed spindle, $l$, a toggle-joint, $k$, a chain-wheel, $n$, and a last-holding spindle, $f^2$, all common to United States Patent No. 203,440, dated May 7, 1878, wherein like parts are designated by like letters. The die-bed spindle has at its upper end a head, (herein marked $l'$,) and the chain-gear $n$ has, as a part of it, a cross head or plate, $n^2$, having two posts, $n^3$, which enter slots in the trimmer-lever $a$ and serve to turn the said lever in unison with the said head, these devices being as now commonly used in heel-trimming machines. The nail-box B, the pattern-plate $b$, top-lift plate C, turn-table plate $d$, bearing-block $i$, having a foot to slide in a groove in the said turn-table plate $d$, the flanged tipping plate $g$, (see Figs. 1 and 5,) the bolts $o$, the arm $j$, having a sleeve-like hub extended into the bearing-plate $i$ and free to rock therein, the bolt $h$, extended through the hub of the said arm $j$, the adjusting-screw 3, the holder, or, as I shall term it, "carriage" $f$, and cam-plate $c$, are and may all be as designated by like letters in United States Patent No. 321,017, except that the shape of the said carriage, externally, has been slightly changed or modified. The cam $c$, which in practice will have usual grooves to move the turn-table plate, is secured to the head of the die-bed spindle. The arm $j$ at one end has extended horizontally from it a stud, $j'$, upon which is loosely pivoted a leg, $j^2$, provided at its lower end with a roller, $j^3$. This stud, leg, and roller are partially shown in Patent No. 321,017, and fully shown and described in Patent No. 217,866, heretofore granted to me. Herein the roller at the lower end of the said leg rests upon a cam, $p$, secured to or forming a part of the cam-plate $c$.

In the partial rotation of the cross-head $n^2$ the turn-table plate $d$ is moved about the heel from breast to breast, the roller $j^3$ during such operation riding upon the edge or top of the cam $p$, causing the arm $j$ and flanged plate $g$ to be tipped or rocked more or less out of true horizontal plane. Herein the carriage $f$ is provided with a segmental groove, in which is mounted the segmental cutter-carrier $p'$, it having a segmental flange, 30, to enter the segmental groove of the said carriage. This cutter-carrying frame has two bearings, 8 10, which receive the journals of the spindle 4, upon which is secured the rotating cutter 5, having a series of blades, with cutting-edges shaped to correspond with the shape to be given to the heel of the boot or shoe to be trimmed. The cutter-carrying frame has two upwardly-extended arms, $p^2$, provided each with a cam-slot, 6, which receives in it a roller or other stud, 7, (see Fig. 6,) extended from one side of the shank $r^4$ of the rand-guide $r$, the said shank being shown as composed of two rods entering a suitable frame, $r^6$, fitted to slide vertically in the top of the carriage $f$, the lip of the rand-guide entering the crease between the upper and heel. The spindle 4, near its lower bearing, 10, has upon it a loose disk, $r'$, which in practice bears against the top lift or other guide or pattern-plate used at the top of the nail-box and on which the heel rests. The spindle carrying the rotary cutter has connected to it one end of a piece of flexible shafting, $t$, of usual construction, the said flexible shafting being driven from any suitable source. (Not shown.)

In the operation of the machine the trimming-lever causes the rotating cutter to travel about the heel from breast to breast, the disk $r'$ resting against the pattern or other plate, as described, the lip of the rand-guide running in the rand-crease, the cam $p$ being of such shape as to rock the tipping plate more or less, so as to place the axis of the rotary cutter more or less out of vertical line, according to the contour of the heel, in order that the edges of the cutters or blades may be presented to the leather approximately tangential to the heel, as is well understood to be essential to heel trimming. During this movement of the lever and turn-table plate the cutter-carrying frame $p'$ is moved in the carriage more or less in the arc of a vertical circle, that depending upon the shape of the plate C and the counter of the shoe against which the rand-guide bears, the said rand-guide not, however, moving out from the rand-crease, the guide and the disk $r'$ being kept pressed against the said counter and the plate C by a spring, (see Fig. 6,) applied in usual manner to the screw 3, as in United States Patent No. 321,017.

The center of the arc in which the cutter-carrying frame is made to move up or down in the carriage $f$ is substantially the top of the top-lift plate, which enables the lip of the rand-guide to remain in the rand-crease as the acting edges of the blades of the rotating cutter follow the heel in the direction of its length, as well as about its sides.

The cutting-edges of the cutter are carried positively more or less under the heel-seat of the heel without removing the rand-guide from the rand-crease, the rand-guide having only a horizontal movement.

Herein it will be noticed that the spindle carrying the rotating cutter has fixed bearings in the cutter-carrying frame, which has a movement in segmental guides of a carriage made movable longitudinally upon a flanged plate, which is free to be rocked or tipped more or less under the control of a cam, this movement taking place and being positive, while the trimming-lever is being partially rotated to carry the rotating cutter about the heel.

I claim—

1. The tipping plate, the laterally-movable carriage thereon, and the segmental cutter-carrying frame having bearings 8 and 10, combined with a rotating cutter secured to a short rigid spindle, 4, mounted in said bearings to operate substantially as described.

2. The tipping plate, the laterally-movable carriage thereon, and the segmental cutter-carrying frame, combined with a rotating cutter, and with a cam and connecting means to control the movement of the tipping plate, to operate substantially as described.

3. The tipping plate, the laterally-movable carriage thereon, and the segmental cutter-carrying frame, combined with a rotating cutter, and with a rotating flexible shaft to rotate the cutter, substantially as described.

4. In a heeling-machine, a carriage and a rand-guide, combined with a rotary cutter, and a segmental frame to carry the said cutter, the said frame and rand-guide having a slot-and-pin connection, whereby the rand-guide has only a longitudinal movement with relation to the carriage, while the segmental frame moves to trim the heel to a greater or less curve under the heel-seat, substantially as described.

5. In a heeling-machine, a nail-box, B, a spindle to hold the heel of the shoe against the nail-box, a rotary cutter, a rotary flexible shaft to drive it, and a rand-guide, combined with the segmental frame to carry the cutter, and a carriage in which the segmental frame moves, as described, as the cutter moves about the heel from breast to breast, the combination being and operating substantially as described.

6. The die-bed spindle, the nail-box, the trimming-lever thereon, turn-table plate $d$, bearing-block $i$, tipping plate, cam $p$, means, substantially as described, between the said cam and tipping plate to move the latter, and the carriage and rand-guide mounted therein, combined with the segmental frame and the rotating cutter mounted thereon, the parts being constructed to operate substantially as described.

In testimony whereof I have signed my name to this specification in the presence of two subscribing witnesses.

CHARLES W. GLIDDEN.

Witnesses:
BERNICE J. NOYES,
F. L. EMERY.